(12) United States Patent
Dore (10) Patent No.: US 12,389,143 B2
(45) Date of Patent: Aug. 12, 2025

(54) LASER MEASUREMENTS FOR LOUDSPEAKER VIBRATION REDUCTION

(71) Applicant: Biamp Systems, LLC, Beaverton, OR (US)

(72) Inventor: Matthew Dore, Anywerpen (BE)

(73) Assignee: Biamp Systems, LLC, Beaverton, OR (US)

( * ) Notice: Subject to any disclaimer, the term of this patent is extended or adjusted under 35 U.S.C. 154(b) by 493 days.

(21) Appl. No.: 17/972,485

(22) Filed: Oct. 24, 2022

(65) Prior Publication Data

US 2023/0131165 A1  Apr. 27, 2023

Related U.S. Application Data

(60) Provisional application No. 63/271,346, filed on Oct. 25, 2021.

(51) Int. Cl.
| | |
|---|---|
| *H04R 1/02* | (2006.01) |
| *G01H 3/10* | (2006.01) |
| *G01H 9/00* | (2006.01) |
| *H04R 29/00* | (2006.01) |
| *H04R 31/00* | (2006.01) |

(52) U.S. Cl.
CPC ............ *H04R 1/02* (2013.01); *G01H 3/10* (2013.01); *G01H 9/00* (2013.01); *H04R 29/001* (2013.01); *H04R 31/00* (2013.01); *H04R 2400/11* (2013.01)

(58) Field of Classification Search
CPC ........ H04R 1/02; H04R 29/001; H04R 31/00; G01H 3/10; G01H 9/00
See application file for complete search history.

(56) References Cited

U.S. PATENT DOCUMENTS

| | | | |
|---|---|---|---|
| 1,975,201 | A | 10/1934 | Elworthy |
| 7,201,252 | B2 | 4/2007 | Nevill |
| 2002/0114483 | A1 | 8/2002 | Azima et al. |
| 2003/0000768 | A1 | 1/2003 | Manrique et al. |
| 2005/0084127 | A1 | 4/2005 | Norton |
| 2007/0223730 | A1 | 9/2007 | Hickling |
| 2016/0341416 | A1* | 11/2016 | Chang .................... H04R 7/045 |
| 2018/0091878 | A1* | 3/2018 | Della Rosa ............. F21V 5/007 |
| 2020/0077197 | A1 | 3/2020 | Inoue et al. |
| 2021/0152964 | A1 | 5/2021 | Lee |

OTHER PUBLICATIONS

Search Report issued in the International Application No. PCT/US22/47777, mailed on Jan. 30, 2023.

* cited by examiner

*Primary Examiner* — Kristina M Deherrera
*Assistant Examiner* — Jean F Morello (57) ABSTRACT

One example process includes playing, via one or more loudspeakers, one or more audio frequencies at a particular sound pressure level, measuring, via a sensor, a displacement of a laser beam being emitted from a laser source through a slot of a soundbar housing the one or more loudspeakers during the playing, and determining, via a processor, one or more characteristic coefficients of a grommet based on the displacement.

20 Claims, 11 Drawing Sheets

LASER MEASUREMENTS FOR LOUDSPEAKER VIBRATION REDUCTION

CROSS-REFERENCE TO RELATED APPLICATIONS

This application is a non-provisional of U.S. provisional patent application No. 63/271,346 entitled, "MINIMIZING LOUDSPEAKER DISTORTION" filed on Oct. 25, 2021 and is related to U.S. non-provisional patent application entitled, "LOUDSPEAKER COVER TO REDUCE VIBRATION" being filed on the same day and is incorporated herein by reference in its entirety.

TECHNICAL FIELD

This application generally relates to vibration reduction and optimization and more particularly vibration optimization for a loudspeaker.

BACKGROUND

In a loudspeaker 'speaker' housing, certain frequencies and/or sound pressure levels may cause a speaker to create an undesirable vibration that can be felt and heard by nearby observers. Speaker housings may include multiple speakers, microphones, cameras, and other devices. To reproduce voice and/or music in a convincing manner, the loudspeaker modules must be capable of outputting sound pressure at high levels, over a broad frequency range. Given the size constraints, this requires high excursion motion of a speaker driver and a passive radiator, which also create unwanted mechanical vibrations.

Mechanical vibrations and unbalanced forces are undesirable in most products, as they can create physical instability, and audible buzzes and rattles. Newer sound devices, such as a soundbar may also contain a microphone array and camera, the performance of which can be adversely affected by mechanical vibrations. To reduce these issues several design elements may be necessary.

SUMMARY

One example method of operation may include one or more of playing, via one or more loudspeakers, one or more audio frequencies at a particular sound pressure level, measuring, via a sensor, a displacement of a laser beam being emitted from a laser source through a slot of a soundbar housing the one or more loudspeakers during the playing, and determining, via a processor, one or more characteristic coefficients of a grommet based on the displacement.

Another example embodiment may include an apparatus that includes a processor configured to play, via one or more loudspeakers, one or more audio frequencies at a particular sound pressure level, a sensor configured to measure a displacement of a laser beam being emitted from a laser source through a slot of a soundbar housing the one or more loudspeakers during the playing, and the processor is configured to determine one or more characteristic coefficients of a grommet based on the displacement.

Another example embodiment may include a non-transitory computer readable storage medium configured to store instructions that when executed cause a processor to perform playing, via one or more loudspeakers, one or more audio frequencies at a particular sound pressure level, measuring, via a sensor, a displacement of a laser beam being emitted from a laser source through a slot of a soundbar housing the one or more loudspeakers during the playing, and determining, via a processor, one or more characteristic coefficients of a grommet based on the displacement.

One example embodiment may provide an apparatus that includes one or more loudspeakers housed in a rigid loudspeaker frame, and a back cover, affixed to the rigid loudspeaker frame, with a base layer and a raised layer fitted against a back side of the rigid loudspeaker frame, wherein the base layer has a uniform layer thickness and the raised layer is a non-uniform grid of raised supports which extend beyond a height of the uniform layer thickness to create a plurality of enclosed portions having the uniform layer thickness.

Another example apparatus may include a back cover of a loudspeaker frame, comprising a base layer and a raised layer fitted against a back side of the rigid loudspeaker frame, and the base layer has a uniform layer thickness and the raised layer is a non-uniform grid of raised supports which extend beyond a height of the uniform layer thickness to create a plurality of uniquely shaped enclosed portions having the uniform layer thickness and wherein each of the enclosed portions is shaped differently from each of the other of the plurality of enclosed portions.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Figure 1:
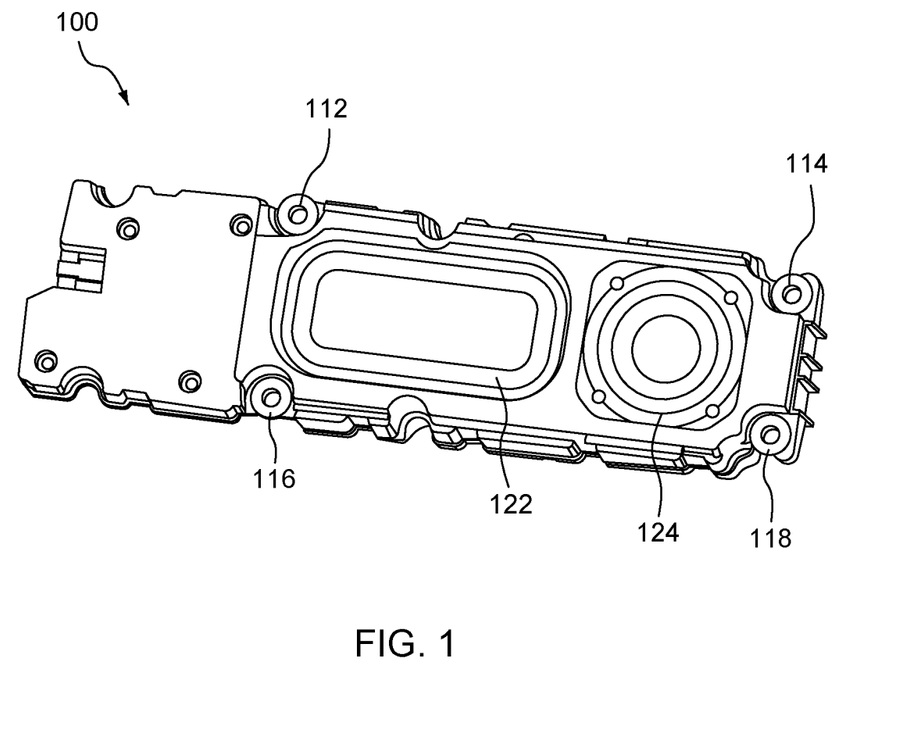
FIG. 1 illustrates a loudspeaker housing configuration according to example embodiments.

FIG. 1 illustrates a loudspeaker housing configuration according to example embodiments. Referring to FIG. 1, the passive radiator 122 is designed to resonate at a particular frequency to extend the low frequency performance of a loudspeaker driver 124. The components 122 and 124 mounted in a rigid frame 100 that is ideally hard plastic material or metal. Both passive radiator 122 and loudspeaker driver 124 provide desirable sounds and certain undesired vibration/distortion. The undesired characteristics are minimized by the housing design and grommet selection. The frame has indentations around the frame body to accommodate screws, grommets and form fitted elements to embrace and secure the frame in a larger speaker housing, such as a soundbar. In this example, there are four circular grommet locations including 112, 114, 116 and 118. The grommets may be any shape. The locations of the grommets and the pass through slots provide a way to secure the loudspeaker frame to a back/rear cover and also to a loudspeaker/soundbar housing. The size and density of the grommets may be optimally selected to reduce vibration caused by the loudspeakers. The location and positions of the loudspeakers, the intensity (sound pressure), frequencies, etc., may all contribute to a vibration that can sound undesirable to a user and/or cause unwanted noise to be recorded by any nearby microphones. Selecting the correctly sized grommets, and ones of an optimal material firmness, can provide reduction of undesired speaker vibration.

Figure 2:
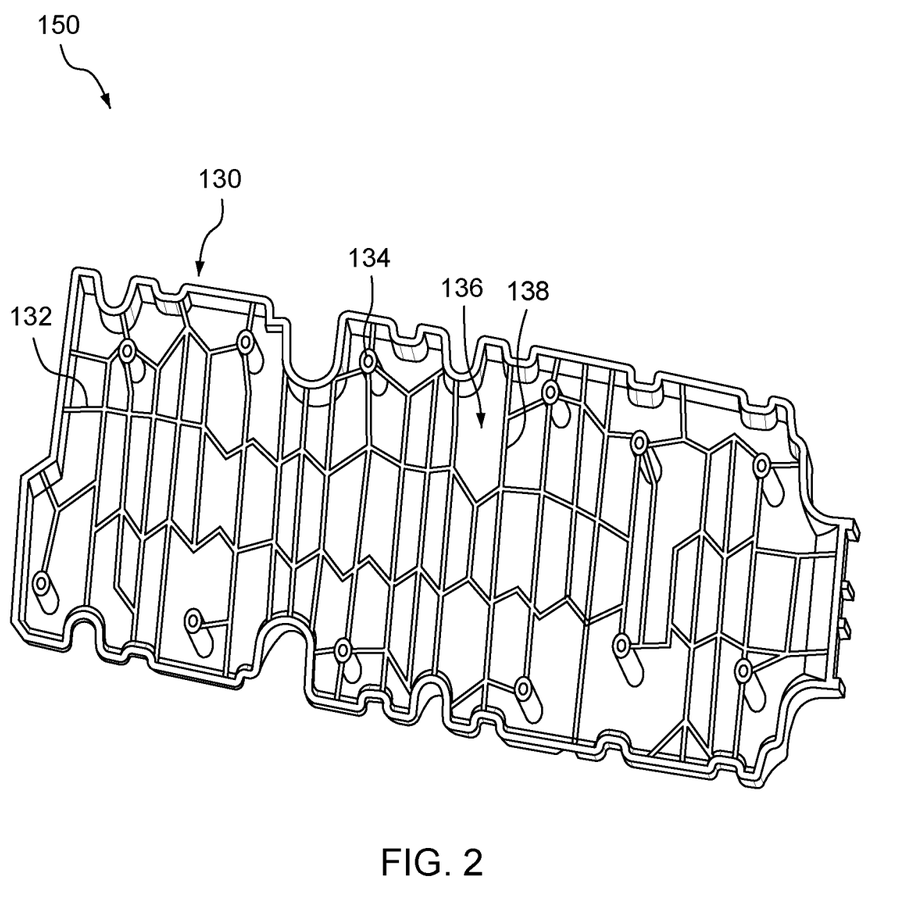
FIG. 2 illustrates a loudspeaker rear housing cover configuration according to example embodiments.

FIG. 2 illustrates a loudspeaker rear housing cover configuration according to example embodiments. Referring to FIG. 2, the back cover may be a same or similar shape to the speaker frame. Collectively, the frame and back cover may be considered the speaker housing, although, there may be another housing, such as a soundbar with multiple speakers, microphones and other components. As may be observed from the example back cover 150 in FIG. 2, the outer edge 130 of the cover has numerous protrusions and indentations to accommodate screws, grommets and other form-fitted components to maintain the speaker(s) in one place.

The base layer 136 may be a first layer of plastic, metal, or other materials which extends the entire distance of the back cover in all such directions. A plurality of non-straight vertical lines (ribs) 138 and horizontal lines (ribs) 132 are illustrated as traversing the length and width of the back cover. The existence of the ribs will strengthen the cover 150. The arbitrary and random alignment of the lines provides a vibration dampening effect on the vibrations produced by the loudspeaker(s), especially at certain sound pressure levels and frequencies. The arrangement of ribs 132/138 will reduce build-up of resonance at certain frequencies. The back cover 150 will vibrate less due to the arbitrary line arrangement. The back cover may also include a plurality of pass-through slots 134 to receive a threaded screw or other type of securing bolt.

In one example, the one or more loudspeakers are housed in a rigid loudspeaker frame, and include a back cover with a base layer 136 and a raised layer, which includes the vertical and horizontal lines 132/138, fitted against a back side of the loudspeaker frame, and the base layer has a uniform layer thickness and the raised layer is a non-uniform grid of raised supports (lines) which extend beyond a height of the uniform layer thickness to create a plurality of enclosed portions. The height of the raised supports may also be a uniform height. One example thickness measurement of the base layer may be 5 mm and the raised portion may be 5 mm above the base layer or a total thickness of 10 mm. Other thicknesses may be used as well. The example of a single enclosed portion or enclosed area 136 may be a particular shape that is unique to all the contiguous enclosed portions around the enclosed area 136. This is accomplished through arbitrary line patterns (i.e., ribs) in both the vertical and horizontal directions.

One example device may include one or more loudspeakers housed in a rigid loudspeaker frame, and a back cover, affixed to the rigid loudspeaker frame, with a base layer and a raised layer fitted against a back side of the rigid loudspeaker frame, and the base layer has a uniform layer thickness and the raised layer is a non-uniform grid of raised supports which extend beyond a height of the uniform layer thickness to create a plurality of enclosed portions having the uniform layer thickness. The raised layer includes the ribs. Each of the enclosed portions have a unique shape that is different from each of the contiguous enclosed portions. The raised layer includes vertical and horizontal ribs which have arbitrary paths extending across a body of the back cover. Each of the enclosed portions includes a different surface area than each of the other of the enclosed portions. A perimeter of the back cover includes a plurality of recessions and protrusions. The base layer includes a plurality of raised cavities to receive a bolt from another portion of the rigid loudspeaker frame.

Another example may include a back cover of a loudspeaker frame, with a base layer and a raised layer fitted against a back side of the rigid loudspeaker frame, and the base layer has a uniform layer thickness and the raised layer is a non-uniform grid of raised supports which extend beyond a height of the uniform layer thickness to create a plurality of uniquely shaped enclosed portions having the uniform layer thickness and each of the enclosed portions is shaped differently from each of the other of the plurality of enclosed portions.

Figure 3:
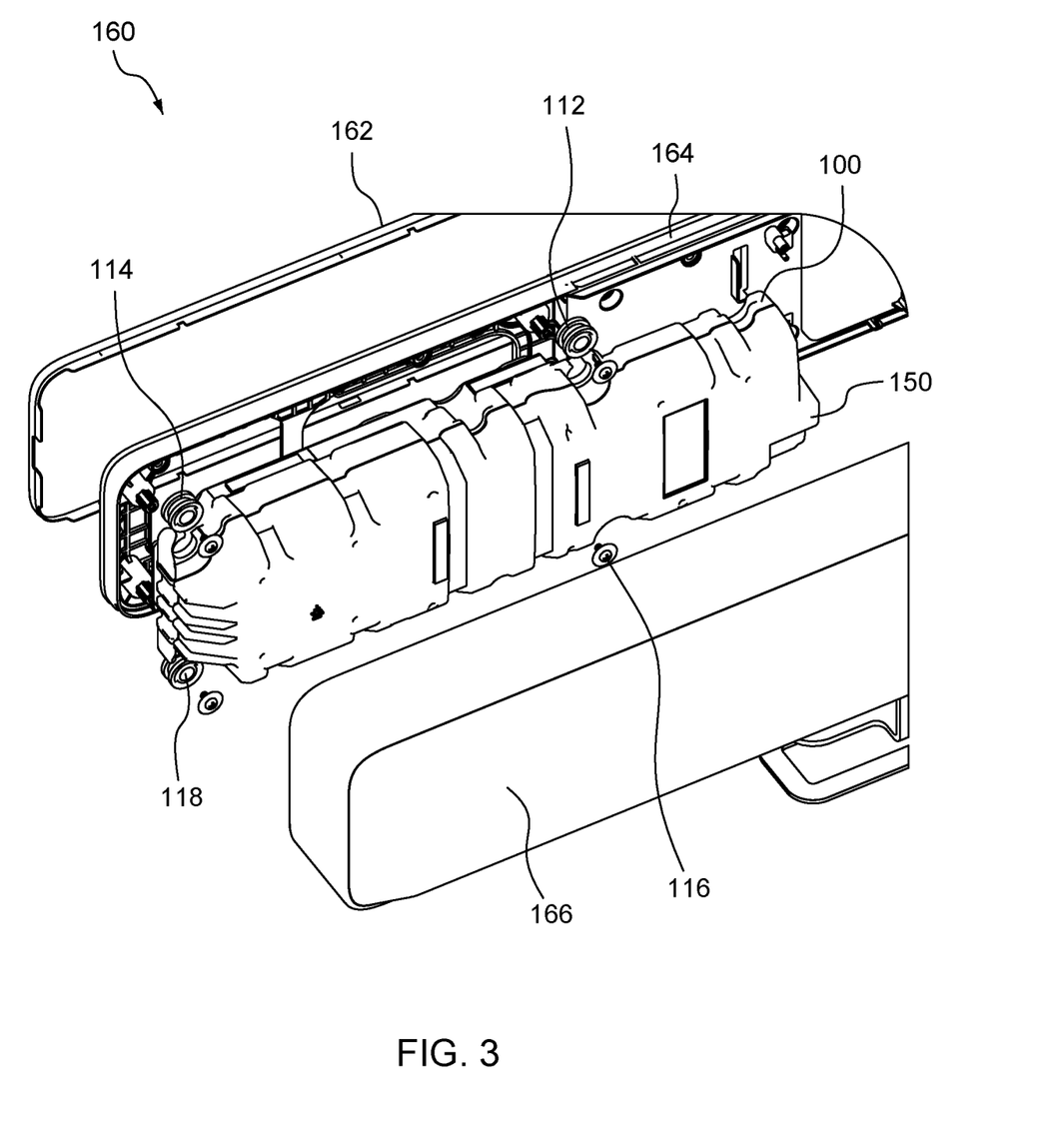
FIG. 3 illustrates a close-up view of a portion of a loudspeaker soundbar configuration according to example embodiments.

FIG. 3 illustrates a close-up view of a portion of a loudspeaker soundbar configuration according to example embodiments. Referring to FIG. 3, the portion of the soundbar 160 illustrates a loudspeaker housing with a front soundbar cover 162, a front speaker housing 164, and a plurality of grommets 112, 114, 116 and 118 to secure the speaker in place and reduce unwanted vibration caused by speaker operation. A rear speaker housing cover 150 is secured into place against a rear portion of the speaker and housing 100. A rear soundbar cover 166 is illustrated as being part of a vertical stand to support the speaker and other components.

Figure 4:
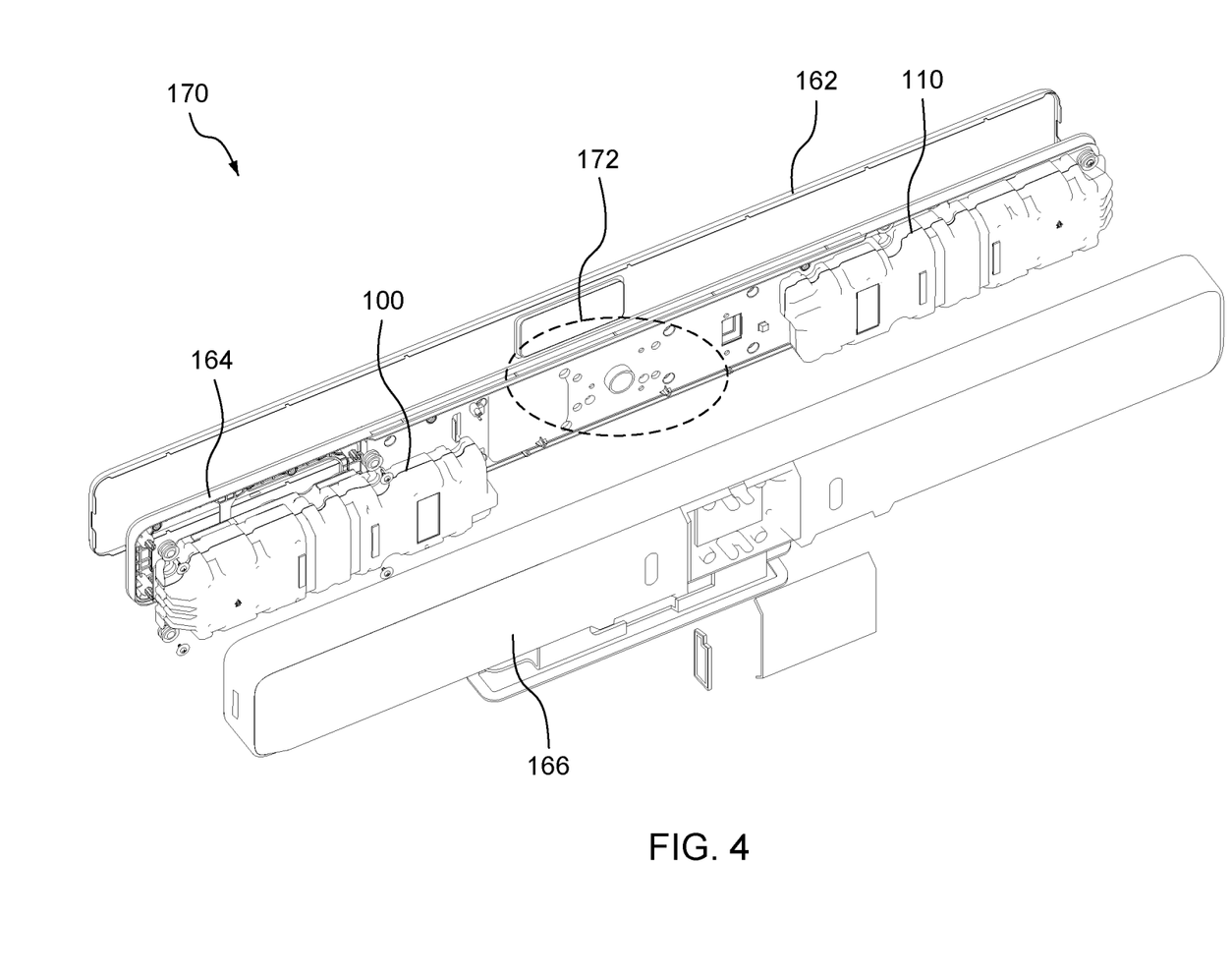
FIG. 4 illustrates a wide view of a loudspeaker soundbar configuration according to example embodiments.

FIG. 4 illustrates a wide view of a loudspeaker soundbar configuration according to example embodiments. Referring to FIG. 4, the example soundbar 170 illustrates two speaker housings 100 and 110 and one or more microphones 172 in a center portion of the soundbar 170. The microphones 172 may be an array of microphones which are used to record audio.

Figure 5A:
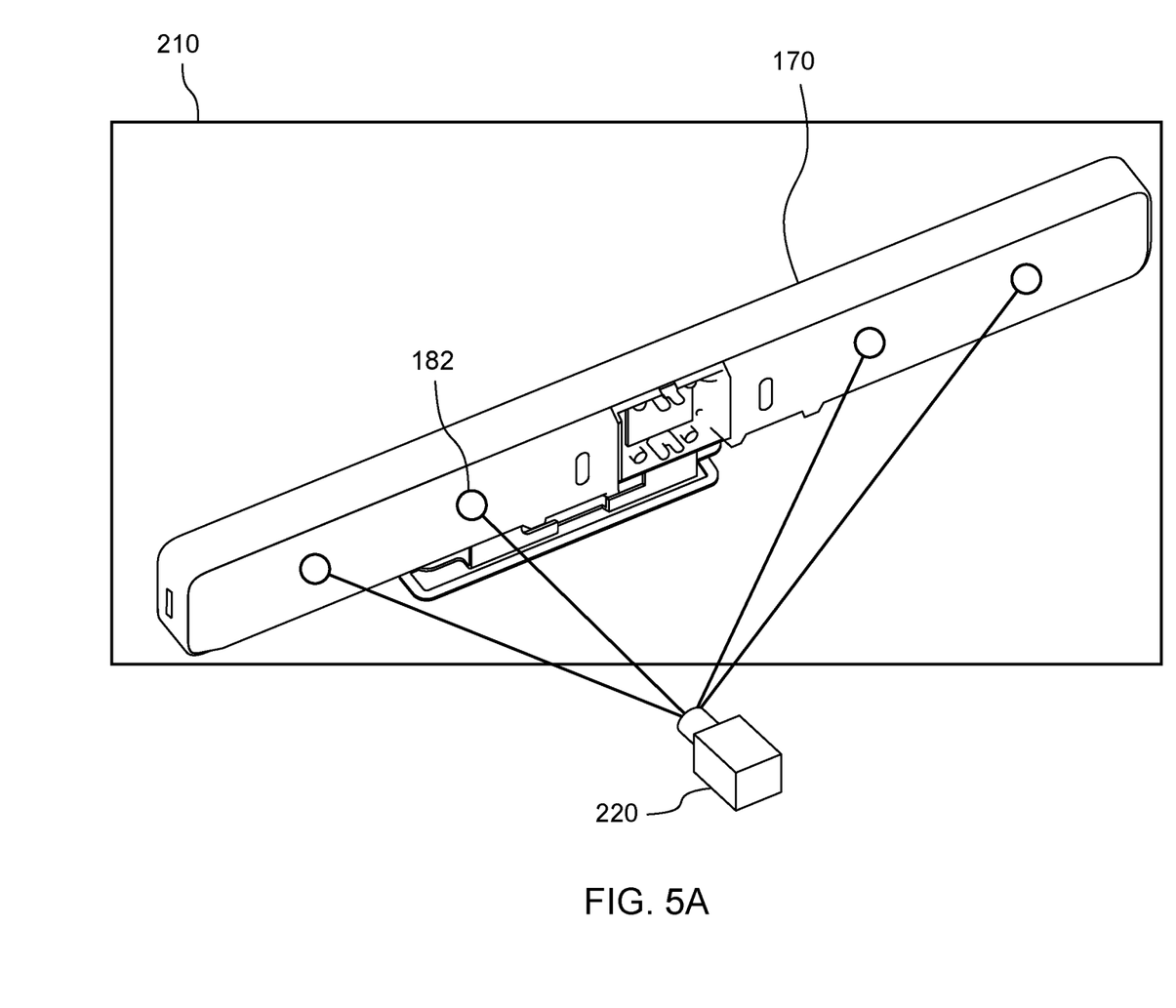
FIG. 5A illustrates a loudspeaker soundbar laser vibration test configuration according to example embodiments.

FIG. 5A illustrates a loudspeaker soundbar laser test configuration according to example embodiments. Referring to FIG. 5A, the testing procedure may include placing the soundbar 170 on a table or similar surface 210 where vibration can be introduced and measured by a laser (laser head) 220 that produces a laser that is intended to pass through slots 182 which may be created in the soundbar 170 in different locations. When the vibration is introduced the laser will be detected as a partial signal for certain frequencies and intensities. The table may include a flat glass pane that is resting on spheres, such as bearings or marbles to provide a way for the soundbar to move freely without resistance. The laser measures the vibration through each of the holes 182 one at a time. The holes 182 are observation points for identifying the vibration at those points.

Figure 5B:
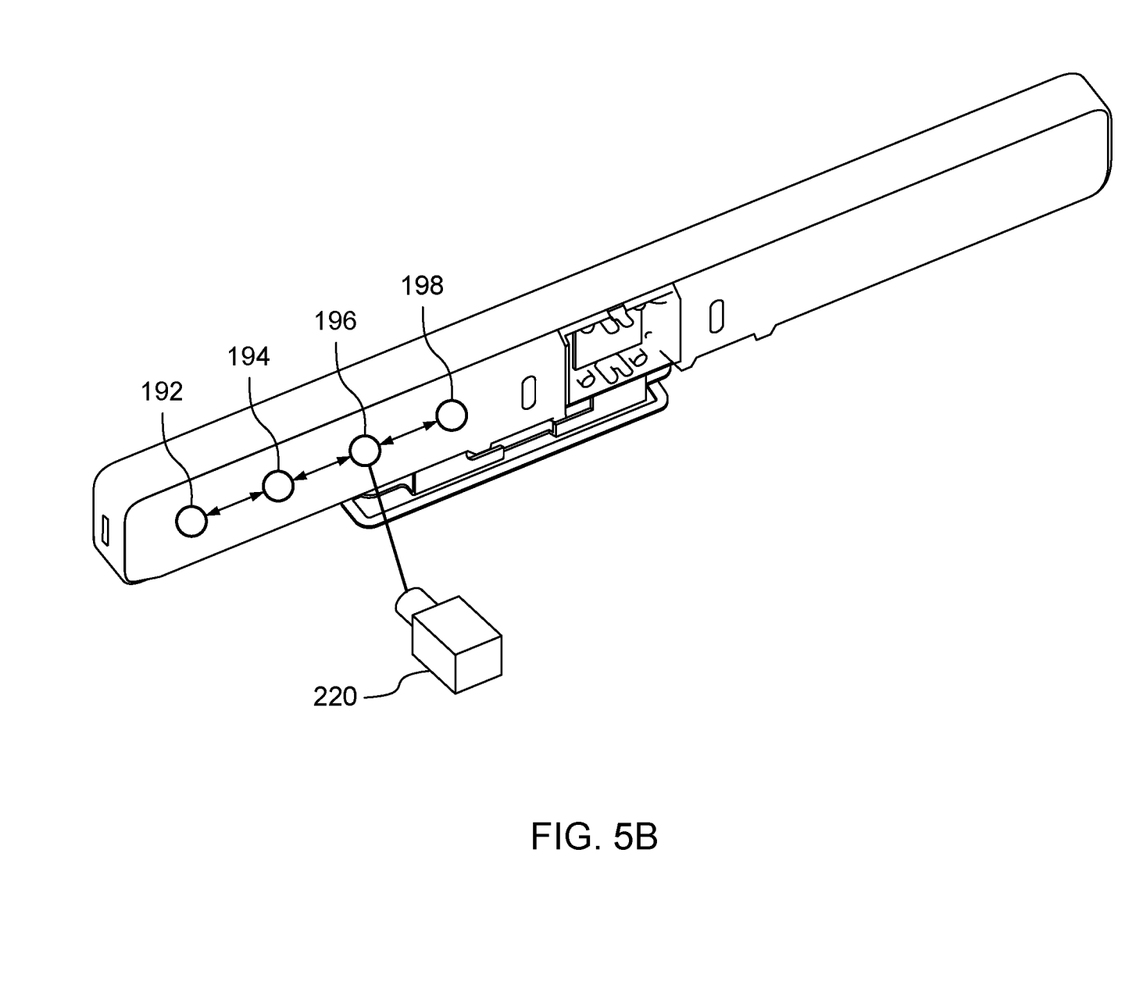
FIG. 5B illustrates another loudspeaker soundbar laser vibration test configuration according to example embodiments.

FIG. 5B illustrates another loudspeaker soundbar laser vibration test configuration according to example embodiments. Referring to FIG. 5B, the four example holes 192, 194, 196 and 198 are vibration observation points where the laser is introduced into each hole, one at a time and the vibration of objects moving perpendicular to the laser beam is identified. A triangulation of the laser position at any moment in time provides an analysis of the degree of vibration. This enables the grommet stiffness and resistance coefficients to be selected for reducing the vibrations at any point in the soundbar body. The stiffness and resistance coefficients can influence the frequency at which the mass (speaker enclosure) resonates on the spring (grommet) and the dampness of that resonance value. A resonance frequency that is outside the operating bandwidth of the speakers and/or other components and very well damped is ideal. The shape, material and other variables of the grommets can affect these values. Grommets can vary in dimension (size) and stiffness and resistance values. The laser measurements can be translated into the grommet selection decision.

In operation, a laser is used for measuring movement from vibration, the loudspeaker assemblies are mounted into the soundbar assembly with the grommets, there may be a printed circuit board (PCB) which include the microphone array(s), which may also be mounted on grommets. The laser detects vibration from sound or from a manual vibration introduced to the soundbar. The vibration should be minimized to avoid the microphones from receiving undesired vibration. The grommets can be selected, depth, density, etc., to accommodate the amount of vibration from adversely interfering with the microphones. The laser is a measurement device which can be detected by an optical signal detector to identify an amount of signal displacement during a vibration event. During texting, an audio signal may be introduced into the loudspeaker(s), such as a broadband noise to excite the speaker, the laser is measuring the excursion, displacement, for all frequencies introduced.

A maximum excursion for the microphone PCB may be below a usable frequency range. A frequency range may be used to introduce low frequencies then higher frequencies, or a broadband input while the laxer is measuring the displacement from the vibration of the frequency output of the speakers. The output may be identified as a voltage from the laser, 1 mm is equal to one volt, and the output is the voltage to the laser. The movement of the laser passing through the slots 182 is monitored via a detection sensor measuring the laser reflection and/or the laser consistency on the other side of the slots 182. The vibration may be greater in the slots 182 which are closer to the microphones or the slots which are further away from the microphones. Different grommets can be selected based on the amount of vibration at different portions of the soundbar 170. In general, the more laser reflected then grommet selection may include hardness, such as how hard it is to compress and, dampening (size), how quickly does the grommet come back to a fully erect position when undergoing deformity from vibration. The grommets have a hardness (stiffness) coefficient (0.1 to 1.0) and a dampening (resistance) coefficient (0.1 to 1.0), stiffness is harder to compress, and dampening is based on resiliency, low dampening and low stiffness would be more springy and spongy, as one example.

Figure 6A:
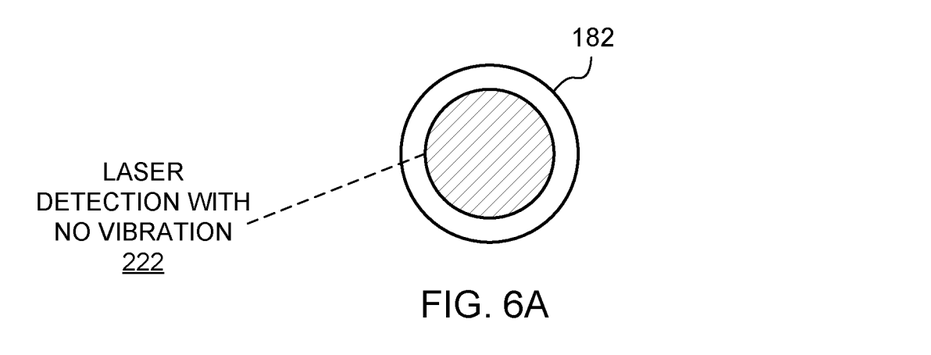
FIG. 6A illustrates a laser detection with no vibration according to example embodiments.

FIG. 6A illustrates a laser detection with no vibration according to example embodiments. Referring to FIG. 6A, the slot 182 may provide full access for the laser signal 222 to pass through without being blocked by any portion of the soundbar body outside the circle.

Figure 6B:
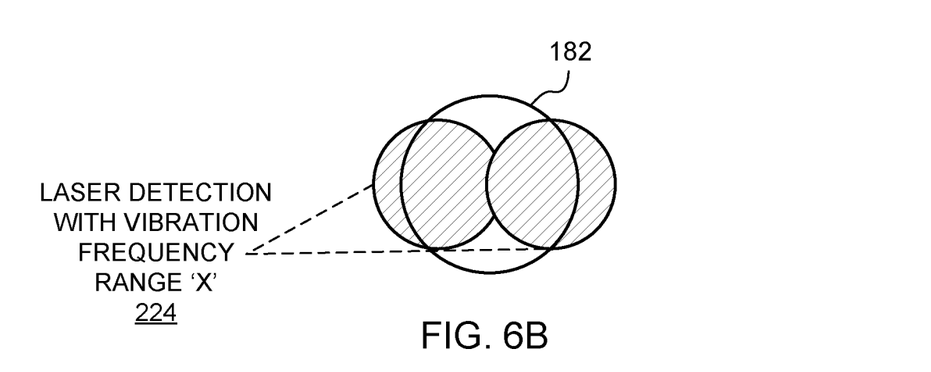
FIG. 6B illustrates a laser detection with vibration according to a first frequency range according to example embodiments.

FIG. 6B illustrates a laser detection with vibration according to a first frequency range according to example embodiments. Referring to FIG. 6B, the laser may be detected 224 as moving left to right or side to side during a first frequency (or frequency range) and for a particular amplitude(s) (sound pressure level). This may require a specific grommet hardness/density coefficient and/or depth/dampening coefficient to alleviate the measure vibration.

Figure 6C:
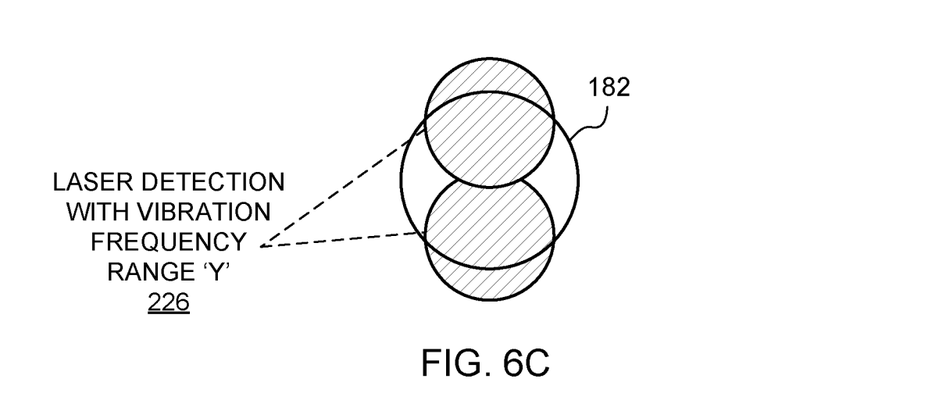
FIG. 6C illustrates a laser detection with vibration according to a second frequency range according to example embodiments.

FIG. 6C illustrates a laser detection with vibration according to a second frequency range according to example embodiments. Referring to FIG. 6C, in another example, the vibrations caused by the speaker operation or via an outside source may be measured as laser displacement based on a different frequency range 226. This different pattern of vibration measured by laser displacement may require a different set of grommet characteristics to alleviate the interference that can be introduced to the microphones.

Figure 7A:
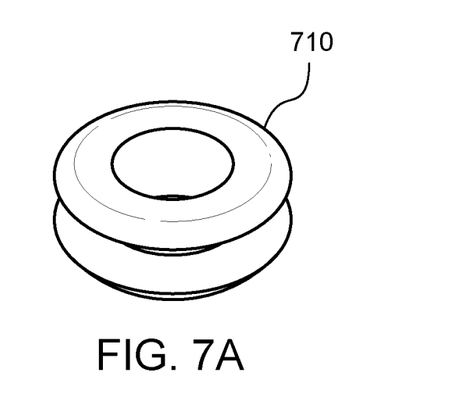
FIG. 7A illustrates a first size grommet according to example embodiments.
Figure 7B:
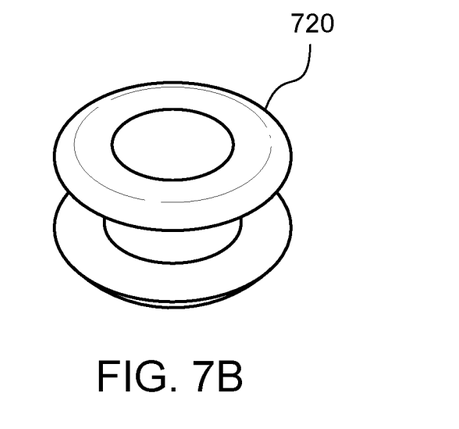
FIG. 7B illustrates a second size grommet according to example embodiments.
Figure 7C:
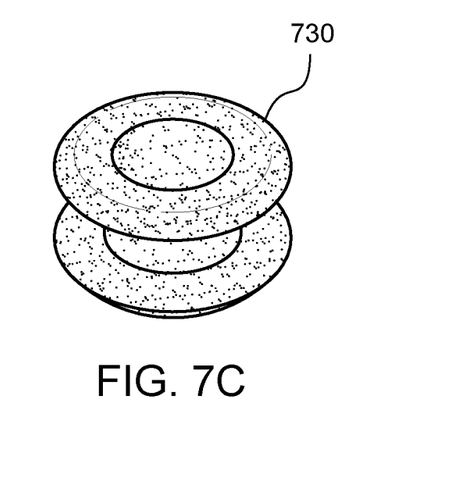
FIG. 7C illustrates a dense grommet according to example embodiments.

FIG. 7A illustrates a first size grommet according to example embodiments. Referring to FIG. 7A, the first grommet size 710 may be a basic height and firmness. FIG. 7B illustrates a second size grommet according to example embodiments. Referring to FIG. 7B, the second grommet size 720 may be a second height and a same firmness. FIG. 7C illustrates a dense grommet according to example embodiments. Referring to FIG. 7C, the grommet 730 may be a basic height and have a larger degree of firmness. The coefficients used to identify the correct grommet may be based on laser displacement measured for a particular audio frequency range and a particular sound pressure level or amplitude. In one example, a frequency sweep of 20 Hz to 200 Hz was performed for a signal level of 0.1 Volts and the input analysis was a tracking bandpass filter, the result was a 1V laser output that corresponds with a 1 mm excursion at 78 Hz for a tuning frequency.

In one example, the laser output voltage may be selected for a particular amount of known displacement. For a particular vibration isolation material and position, the input signal may be forwarded to the speakers for 20 Hz-1 kHz in a swept sine wave. At a point of interest on the soundbar (e.g., near the microphone array in the center) a displacement is measured for each frequency. All points of interest may be measured (different slots 182) along the soundbar body. The measurement data can now by analyzed for determining a minimum amount of detrimental mechanical vibration transmitted from the speakers to the points of interest, such as maximum displacement, average displacement, displacement peaks occurring in an operating range of the microphone array.

Figure 8A:
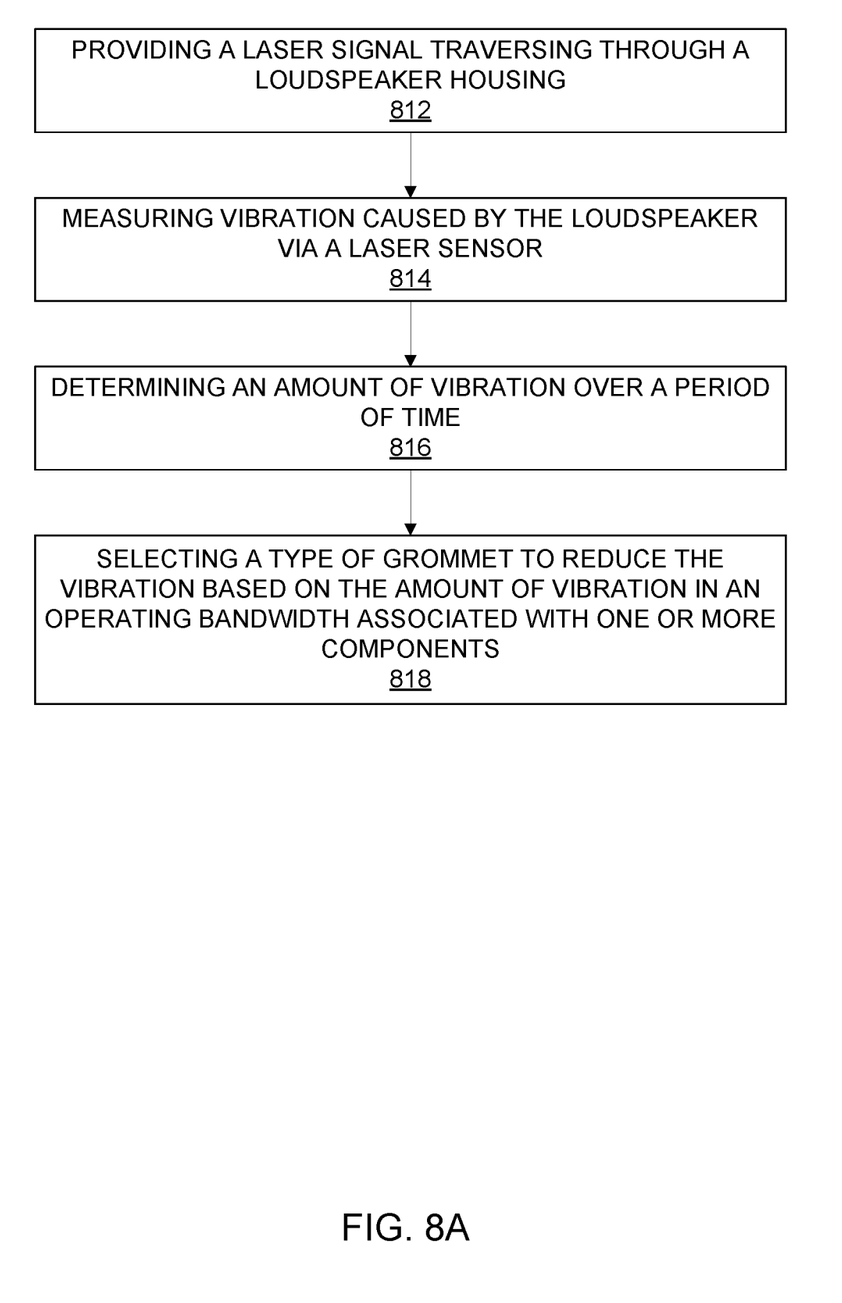
FIG. 8A illustrates a flow diagram of an example method of operation according to example embodiments.

FIG. 8A illustrates a flow diagram of an example method of operation according to example embodiments. Referring to FIG. 8A, the process includes providing a laser signal traversing a hole in a loudspeaker housing 812. The laser may be directed at one hole at a time and measurements may be performed by triangulating the laser signal via a laser sensor associated with the laser head. The measuring of vibration caused by the loudspeaker is measured 814 for various frequencies and for various periods of time. The amount of vibration is identified by triangulating the laser signal over a period of time 816. The type of grommet is selected to reduce the vibration based on the amount of vibration detected in an operating bandwidth associated with one or more components of the soundbar which is based on the location of the measurements (hole locations). Each hole is measured with the laser for a range of frequencies to produce a particular grommet at that particular location of the soundbar. Each grommet installed at each of a plurality of locations of the speaker housing mounted to the soundbar frame are selected according to the laser feedback information identified at each pass through hole.

Figure 8B:
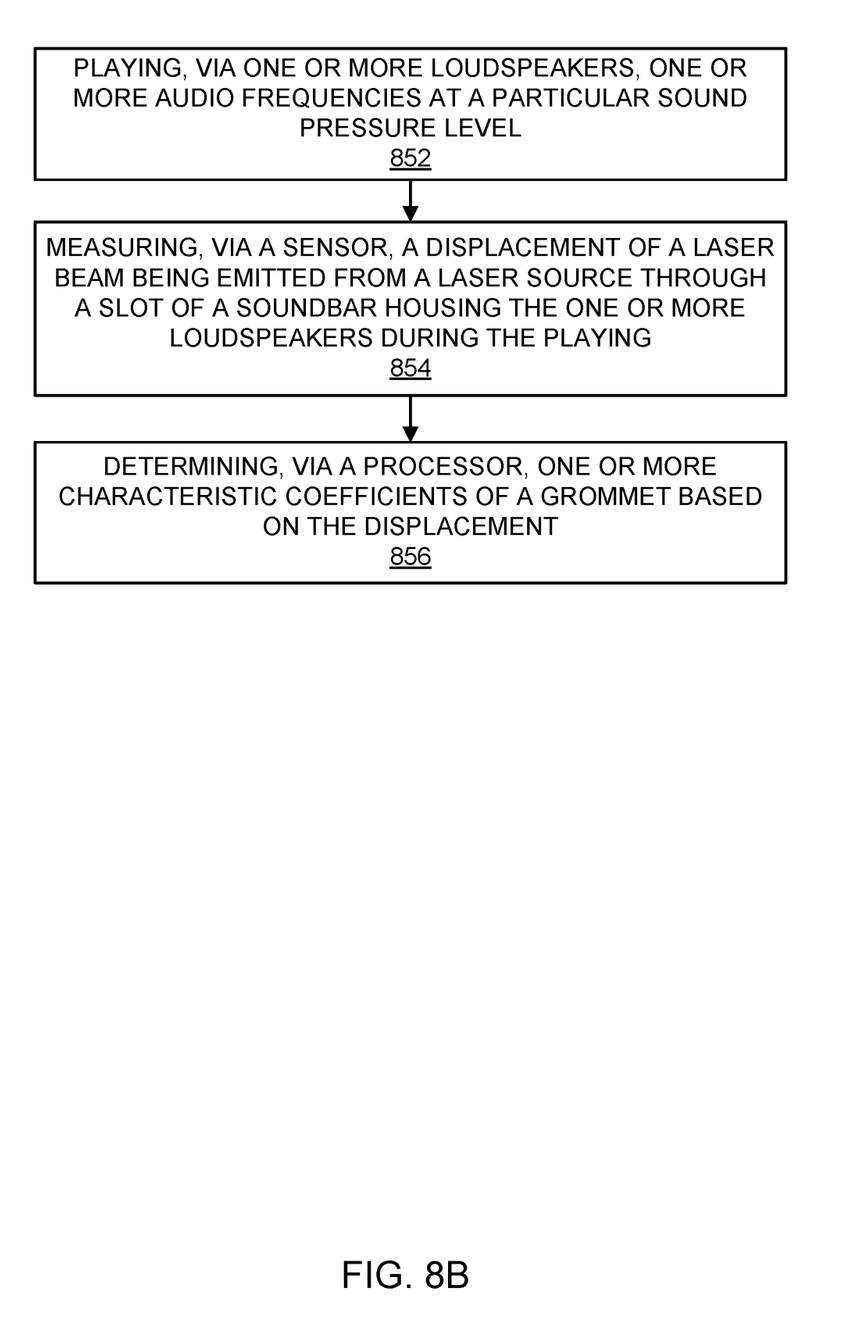
FIG. 8B illustrates a flow diagram of an example method of operation according to example embodiments.

FIG. 8B illustrates another example method of Another example embodiment may include a process that includes playing, via one or more loudspeakers, one or more audio frequencies at a particular sound pressure level 852, measuring, via a sensor, a displacement of a laser beam being emitted from a laser source through a slot of a soundbar housing the one or more loudspeakers during the playing 854, and determining, via a processor, one or more characteristic coefficients of a grommet based on the displacement 856. The process may also include performing the measuring at a plurality of slots of the soundbar. The characteristic coefficients may include one or more of a density coefficient and a dampening coefficient. The displacement of the laser beam is measured by a triangulation measurement measured by a sensor associated with the laser source. The playing, via the one or more loudspeakers, of the one or more audio frequencies at a particular sound pressure level includes playing a plurality of frequencies, one at a time, for a period of time. The playing, via the one or more loudspeakers, of the one or more audio frequencies at a particular sound pressure level includes playing a plurality of frequencies, one at a time, for a period of time at varying sound pressure levels. The process may also include selecting, via the processor, a density coefficient and a dampening coefficient required by the grommet.

The triangulation measuring performed by the laser sensor and corresponding processor system (integrated system, computer coupled device, etc.) will perform a distance measurement by an angle calculation. The sensor and laser configuration operates by projecting a laser spot onto a measurement object (holes in the soundbar). The reflected light of the laser will be considered an incident light that is reflected at a receiving element (sensor) at a certain angle depending on the distance. From the position of the light spot received on the receiver sensor and the distance from the sender to the receiver element, the distance to the measurement object is calculated by the sensor. The vibration of the soundbar as experienced from different frequencies and different sound pressure levels will provide various feedback to the laser sensor via the triangulation process. The values produced can be matched by the grommet The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 9:
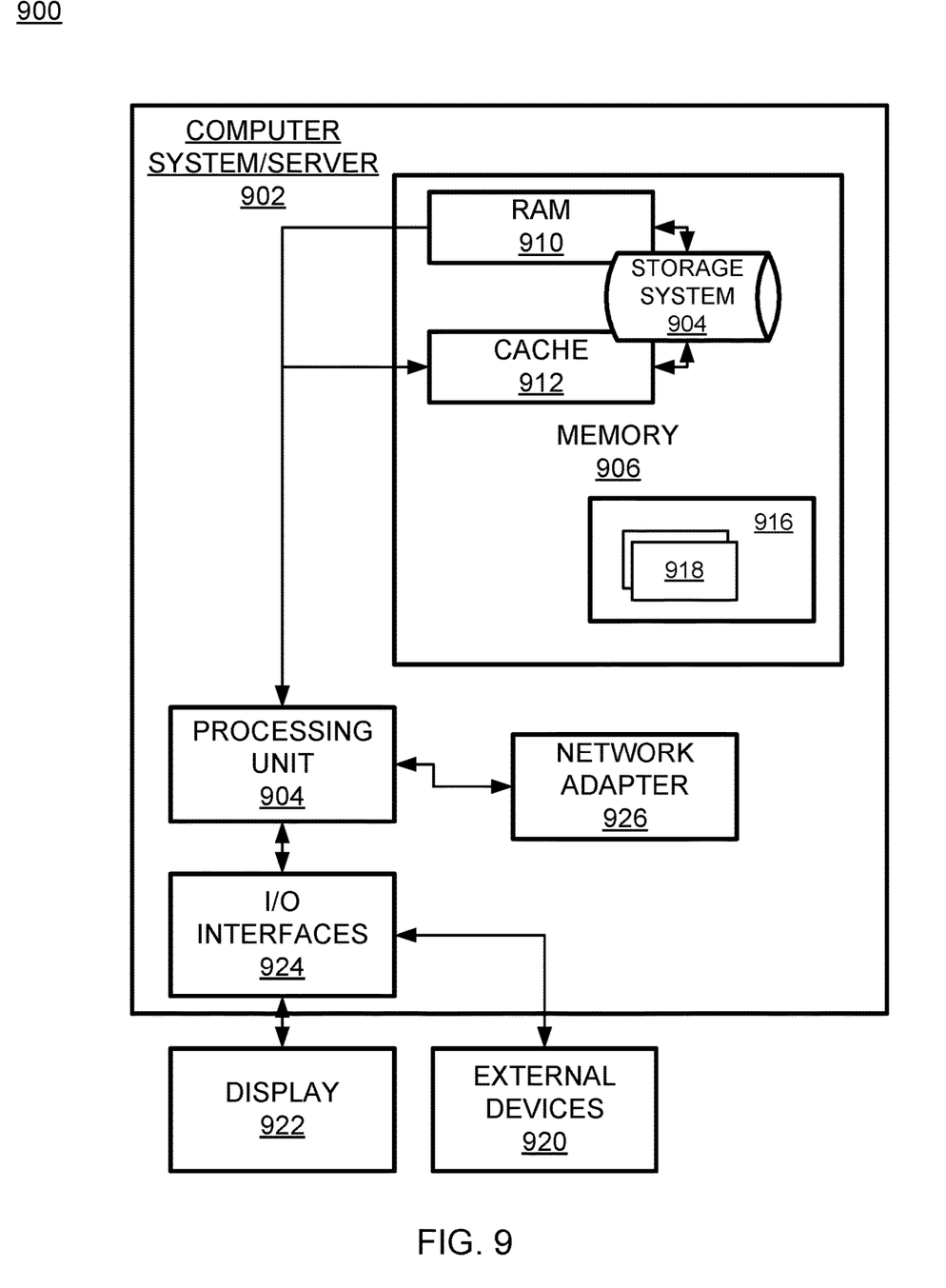
FIG. 9 illustrates a computer system configuration configured to compute one or more test operations according to example embodiments.

FIG. 9 is not intended to suggest any limitation as to the scope of use or functionality of embodiments of the application described herein. Regardless, the computing node 900 is capable of being implemented and/or performing any of the functionality set forth hereinabove.

In computing node 900 there is a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 9, computer system/server 902 in cloud computing node 900 is displayed in the form of a general-purpose computing device. The components of computer system/server 902 may include, but are not limited to, one or more processors or processing units 904, a system memory 906, and a bus that couples various system components including system memory 906 to processor 904.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media. System memory 906, in one embodiment, implements the flow diagrams of the other figures. The system memory 906 can include computer system readable media in the form of volatile memory, such as random-access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 906 may include at least one program product having a set (e.g., at least one) of program modules that are configured to carry out the functions of various embodiments of the application.

Program/utility 916, having a set (at least one) of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 902 may also communicate with one or more external devices 920 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via I/O interfaces 924. Still yet, computer system/server 902 can communicate with one or more networks such as a local area network (LAN), a general wide area network (WAN), and/or a public network (e.g., the Internet) via network adapter 926. As depicted, network adapter 926 communicates with the other components of computer system/server 902 via a bus. It should be understood that although not displayed, other hardware and/or software components could be used in conjunction with computer system/server 902. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising
    playing, via one or more loudspeakers, one or more audio frequencies at a particular sound pressure level;
    measuring, via a sensor, a displacement of a laser beam being emitted from a laser source through a slot of a soundbar housing the one or more loudspeakers during the playing; and
    determining, via a processor, one or more characteristic coefficients of a grommet based on the displacement.

2. The method of claim 1, wherein the measuring is performed at a plurality of slots of the soundbar.

3. The method of claim 1, wherein the characteristic coefficients comprise one or more of a density coefficient and a dampening coefficient.

4. The method of claim 1, wherein the displacement of the laser beam is measured by a triangulation measurement measured by a sensor associated with the laser source.

5. The method of claim 1, wherein the playing, via the one or more loudspeakers, of the one or more audio frequencies at a particular sound pressure level comprises playing a plurality of frequencies, one at a time, for a period of time.

6. The method of claim 1, wherein the playing, via the one or more loudspeakers, of the one or more audio frequencies at a particular sound pressure level comprises playing a plurality of frequencies, one at a time, for a period of time at varying sound pressure levels.

7. The method of claim 1, comprising selecting, via the processor, a density coefficient and a dampening coefficient required by the grommet.

8. An apparatus comprising
    a processor configured to play, via one or more loudspeakers, one or more audio frequencies at a particular sound pressure level;
    a sensor configured to measure a displacement of a laser beam being emitted from a laser source through a slot of a soundbar housing the one or more loudspeakers during the playing; and
    wherein the processor is configured to determine one or more characteristic coefficients of a grommet based on the displacement.

9. The apparatus of claim 8, wherein the measurement is performed at a plurality of slots of the soundbar.

10. The apparatus of claim 8, wherein the characteristic coefficients comprise one or more of a density coefficient and a dampening coefficient.

11. The apparatus of claim 8, wherein the displacement of the laser beam is measured by a triangulation measurement measured by the sensor associated with the laser source.

12. The apparatus of claim 8, wherein the processor being configured to play, via the one or more loudspeakers, of the one or more audio frequencies at a particular sound pressure level comprises the processor being configured to play a plurality of frequencies, one at a time, for a period of time.

13. The apparatus of claim 8, wherein the processor being configured to play, via the one or more loudspeakers, of the one or more audio frequencies at a particular sound pressure level comprises the processor being configured to play a plurality of frequencies, one at a time, for a period of time at varying sound pressure levels.

14. The apparatus of claim 8, wherein the processor selects a density coefficient and a dampening coefficient required by the grommet.

15. A non-transitory computer readable storage medium configured to store instructions that when executed cause a processor to perform:
    playing, via one or more loudspeakers, one or more audio frequencies at a particular sound pressure level;
    measuring, via a sensor, a displacement of a laser beam being emitted from a laser source through a slot of a soundbar housing the one or more loudspeakers during the playing; and
    determining, via a processor, one or more characteristic coefficients of a grommet based on the displacement.

16. The non-transitory computer readable storage medium of claim 15, wherein the measuring is performed at a plurality of slots of the soundbar.

17. The non-transitory computer readable storage medium of claim 15, wherein the characteristic coefficients comprise one or more of density coefficient and a dampening coefficient.

18. The non-transitory computer readable storage medium of claim 15, wherein the displacement of the laser beam is measured by a triangulation measurement measured by a sensor associated with the laser source.

19. The non-transitory computer readable storage medium of claim 15, wherein the playing, via the one or more loudspeakers, of the one or more audio frequencies at a particular sound pressure level comprises playing a plurality of frequencies, one at a time, for a period of time.

20. The non-transitory computer readable storage medium of claim 15, wherein the playing, via the one or more loudspeakers, of the one or more audio frequencies at a particular sound pressure level comprises playing a plurality of frequencies, one at a time, for a period of time at varying sound pressure levels.

* * * * *